United States Patent
Wall

[11] 3,879,240
[45] Apr. 22, 1975

[54] METHOD OF MAKING A UNITARY CAMPER STRUCTURE

[76] Inventor: Raymond W. Wall, 10265 S.E. Columbus, Albany, Oreg. 97321

[22] Filed: Aug. 17, 1973

[21] Appl. No.: 389,256

[52] U.S. Cl. ............... 156/78; 52/309; 117/72; 117/105.5; 117/136; 156/71; 156/245; 156/256; 161/153; 161/190; 264/46; 296/23 MC
[51] Int. Cl. ............... B32g 31/14
[58] Field of Search ........... 264/45, 46; 296/23 MC; 156/78, 256, 71; 117/72, 136, 105.5; 161/159, 153, 189, 190; 52/309

[56] References Cited
UNITED STATES PATENTS

| | | |
|---|---|---|
| 3,303,617 | 2/1967 | Hessburg et al. ............ 264/46 X |
| 3,331,173 | 7/1967 | Elsner ............ 52/309 X |
| 3,444,280 | 5/1969 | Pulaski ............ 264/46 X |
| 3,446,881 | 5/1969 | Poole ............ 156/78 X |
| 3,496,689 | 2/1970 | Nerem ............ 52/204 |
| 3,520,769 | 7/1970 | Baker ............ 264/46 X |

*Primary Examiner*—Edward G. Whitby
*Attorney, Agent, or Firm*—Chernoff & Vilhauer

[57] ABSTRACT

A unitary camper body formed of an exterior fiberglass-reinforced shell and supporting skeletal metal framework integrally bonded together by an insulating core layer of low-density foamed polyurethane. The core layer also permanently secures in position any fixtures included in the camper structure. A second layer of high-density foamed polyurethane overlaid on the surface of the first layer provides an inner protective facing for the camper structure. The camper body is fabricated by placing a preformed fiberglass-reinforced shell over a skeletal metal framework so as to form a 'mold against which a first layer of low-density polyurethane foam is sprayed from the inside to form an inner core, followed by the spraying against the exposed surface of the core layer of a thin second layer of high-density polyurethane foam which forms the interior facing of the camper structure.

7 Claims, 4 Drawing Figures

PATENTED APR 22 1975  3,879,240
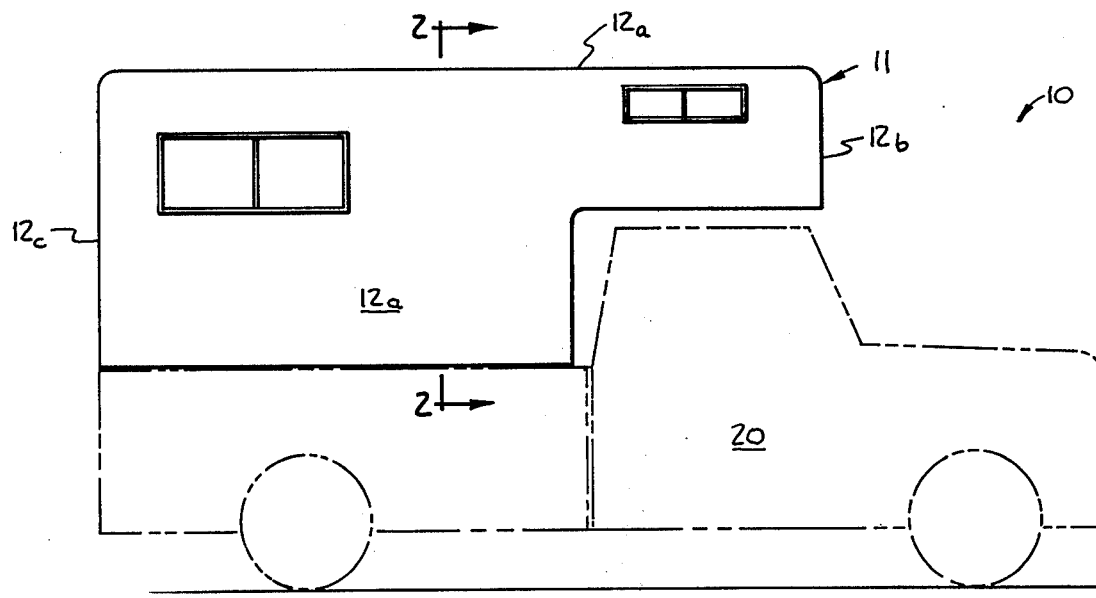
FIG. 1
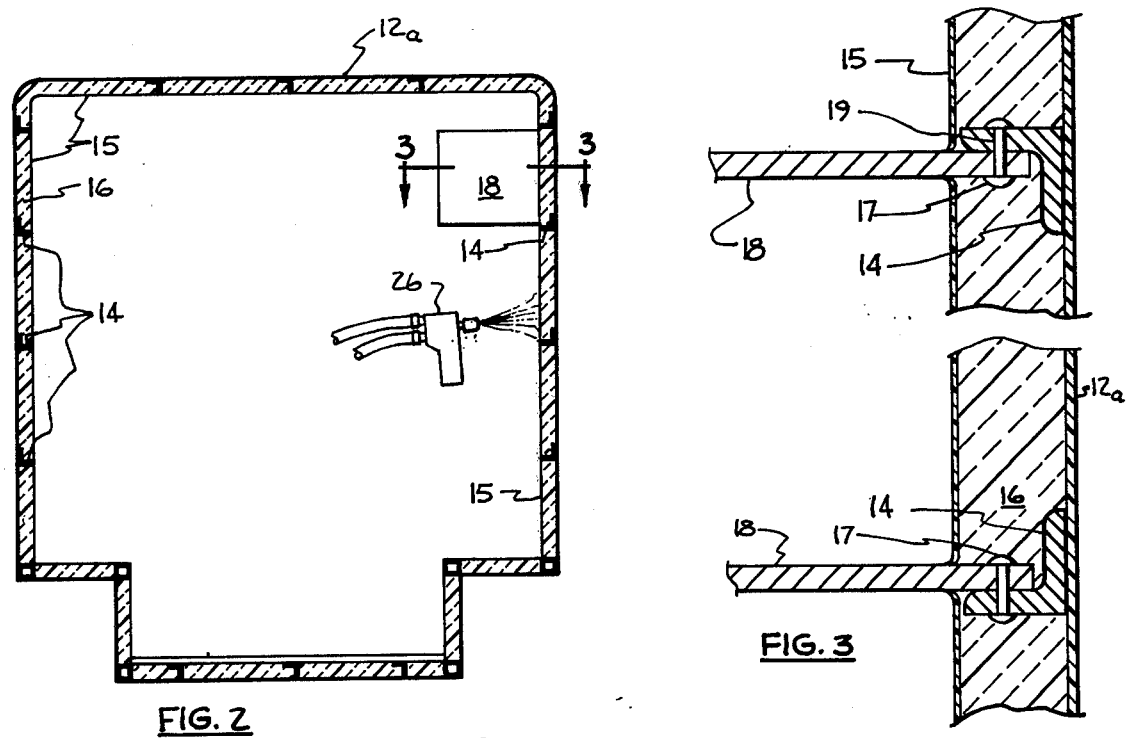
FIG. 2
FIG. 3
FIG. 4

METHOD OF MAKING A UNITARY CAMPER STRUCTURE

BACKGROUND OF THE INVENTION

The present invention relates to the construction of a camper body or similar article.

Due to the increasing migration of vacationers to the vast outdoor areas of this country, there has been a dramatic increase in the recreational vehicle industry. In particular, camper bodies mounted on pick-up trucks have become especially popular because of their adaptability to presently existing vehicles and their relatively low cost when compared with other mobile recreational living units available to the public such as trailers and motor homes Various types of composite camper body constructions utilizing a laminated foamed plastic core and metal or wood facings are known to the prior art. For example, Robinson U.S. Pat. No. 3,297,355 depicts a camper body having a metal frame with a layer of insulation riveted thereto, wherein the outer portion of the camper body is constructed of a preformed weather-resistant layer secured to the insulating layer by rivets or other auxiliary fastening means. In Nerem U.S. Pat. No. 3,496,689 a camper is described having sandwiched panels made of an outer sheet metal skin, a core of expanded foam plastic and an inner rigid facing of plywood or hardboard. In this latter design reinforced members are located between the respective skin and facing portions along the longitudinal midpoint of the roof section providing support for the camper structure. The panel components are preformed and bonded together, as well as being secured to the reinforcing member, by means of a reinforced elastomeric adhesive. Finally, U.S. Pat. No. 3,652,119 to Hall describes a camper cabin including a lower shell formed of a molded fiberglass-type structure secured to a U-shaped reinforcement frame by a resinous polymeric adhesive. Fixtures, such as cabinets and the like, are mounted within the shell and permanently held in place by screws and a resinous bonding agent. For insulation purposes only, a polyurethane foam layer is applied to the outer portion of the end and side walls which make up the inner shell. A second upper shell section is supported so that it can be lowered and raised, with respect to the lower section, in a telescoping fashion. The upper section comprises inner and outer fiberglass plastic shells surrounding a skeletal framework and having therebetween a foam plastic inner core filling. The respective shells are held in place on the metal framework by a resinous adhesive or other suitable fastening means such as screws or rivets. The foam plastic inner core is bonded to the shells and framework by a similar type adhesive.

In each of these prior art camper structures, supplemental securing means such as adhesives, rivets, screws and the like, are required to permanently fasten the respective component portions together, i.e., the shells, core, fixtures and skeletal framework, one to the other in order to form the composite camper structure. In addition, all the individual components must first be fabricated separately and then, at a later time, combined to produce the camper body. Building a camper structure in accordance with the teachings of these prior art methods is quite time-consuming due to the cumbersome step-by-step task of mounting and aligning the various fabricated components so that they can then be permanently secured in place by the aforementioned supplemental securing means. The conventional fabrication process is further complicated and drawn-out if an adhesive is employed since a minimum bonding time must be observed between each step in order to permit the adhesive to properly cure. Also, the prior art methods are more costly since, beside requiring supplemental securing means, they necessitate either extra fabrication procedures to preform the core and inner shell components or, alternatively, must have the prefabricated camper components available in stock for assembly when needed. Finally, even after the camper body is fully assembled, since it is formed by conventional techniques, it is but a composite of many separate components, none of which is integrally associated one with the other. Therefore, a rattle-free, watertight construction is unlikely to be maintained after several years of use in driving over the rough terrain to which a camper is typically exposed.

Therefore, a real need exists in the industry for a camper body construction which eliminates time-consuming and cumbersome additional preforming and curing steps, is inexpensively and quickly fabricated, requires a minimum number of components to be assembled and, when completed, provides a unitary structure having a long and useful life.

SUMMARY OF THE INVENTION

This invention relates to a camper body construction, and a method for making same, which solves the limitations present in the aforementioned prior art camper structures. In the camper body construction herein disclosed, the top, front and rear sections of a rigid, impact-resistant shell preferably fabricated of a fiberglass-reinforced resin or other suitable material, are first formed in a mold, then removed and placed over a supporting skeletal framework, preferably made of aluminum, steel or other structural members, and the respective parts combined, together with a suitably constructed floor member, by conventional bonding techniques. Fixtures, such as cabinetry, shelving, sinks and the like to be installed are then temporarily laid in against the inner side of the framework, preferably prior to placement of the exterior shell sections, using only the minimum number of fasteners required to temporarily retain the fixtures during the subsequent spraying step. Next, a foamable polymer, such as low-density polyurethane, is sprayed from the inside around the fixtures and against the shell and the frame. During the spraying operation, the shell and frame act as a mold for the sprayed polymer. The foam layer rapidly cures in situ, adhering to and locking all of the components together into a unitary structure formed of the outer shell, skeletal frame, fixtures and foam core layer. This low-density foam layer also serves as an effective temperature and sound insulator for the camper structure. Thereafter, a thin second layer of polymeric foam, preferably a high-density polyurethane, is sprayed against the exposed inner side of the low-density core layer to form a rigid protective interior facing to complete the camper body structure.

The method of fabrication of the present invention produces a camper body having a totally integrated construction, rigidly secured fixtures and a greater resistance to impacts and the effects of wear. Furthermore, the need for shaped and preformed materials is substantially minimized, since the insulating core and inner facing components are both produced in situ within the confines of the exterior shell and framework which act as a mold during their formation. Finally, there is virtually no time lag between the spraying of the first insulating core layer and subsequent protective facing layer so that assembly of the camper bodies can be rapidly accomplished on a production line basis.

It is therefore a principal objective of the present invention to provide a novel and improved unitary camper body which is of inexpensive and sturdy construction, easily and rapidly fabricated, and requires a minimum quantity of auxiliary securing means.

It is a principal feature of this invention to provide a unitary component camper body, having a minimum number of preformed components, which includes an exterior impact-resistant shell, a supporting skeletal framework, fixtures, an insulating foam polymeric core layer, and a second facing layer forming an inner protective facing for the camper structure.

It is a further feature of this invention to provide, in a method for making a composite camper body structure, the steps of temporarily attaching fixtures to the interior of a skeletal framework, placing an exterior impact-resistant shell over the skeletal framework, and thereafter spraying successive layers of foamable polymeric materials from within the interior of the mold formed by the shell and framework and around the fixtures, which layers upon curing insulate the camper body and rigidly secure together the fixtures, shell and framework into a unitary body.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a front elevational view of a camper body construction in accordance with the present invention.

FIG. 2 is an enlarged sectional view, taken along the line 2—2 in FIG. 1, showing the spraying of the inner core layer of the camper body.

FIG. 3 is a detail of the camper body cross-section, taken along line 3—3 in FIG. 2.

FIG. 4 is a longitudinal sectional view showing the spray formation of the top section of the exterior shell of the camper.

DETAILED DESCRIPTION OF THE INVENTION

Referring initially to FIGS. 1–4, a camper, generally designated as 10, is comprised of a unitary camper body 11 adapted to be carried on the bed of a pick-up truck 20. The camper body includes an exterior shell 12 constructed of top, front and rear sections 12a–12c, respectively, fabricated of an impact-resistant material such as a fiberglass-reinforced resin or other suitable substance and supported on a skeletal reinforcing framework 14, formed of steel, aluminum or other structural materials. Framework 14 can be fabricated in any desired structural configuration, such as metal tubing and the like, or if desired, metal angle members may be employed. Fixtures 18 such as cabinets and the like, which are installed in a manner hereinafter to be described, are mounted within the confines of the framework in the interior of the camper body.

A core layer 16 of cured polymeric foam material acts substantially as the sole means for both insulating the camper body and to secure and lock together the outer shell, skeletal frame and fixtures, respectively, to form a rattle-proof, sound and temperature-insulated unitary body. Although any polymeric substance which is capable of suitably performing the dual insulation and bonding functions can be employed, a low-density polyurethane material is preferred. A thin second layer 15, also of polymeric foam, and preferably a high-density polyurethane foam, is overlaid on the exposed inner surface of the core layer 16 and forms a laminated coating throughout the inner portion of the camper body serving as both a decorative and protective inner facing therefor.

To make the aforedescribed camper body structure 10, the three sections, i.e., the top 12a, front 12b and rear 12c, which comprise the exterior shell 12 of the camper, are each first fabricated in a suitable preformed female mold and, after being removed therefrom, the individual sections are permanently assembled into a unitary shell by mounting the sections on the skeletal framework 14 using a conventional bonding agent such as a resinous adhesive for binding the individual sections one to the other. Fixtures 18 are then laid in at preselected locations against framework 14 and temporarily supported in place by fasteners 17. The combination of exterior shell 12 and skeletal framework 14 form a self-contained mold against the inside of which is sprayed the core layer 16 of low-density insulating polymeric foam. The second layer 15 of high-density polymeric foam is then sprayed on the inside of the core layer immediately thereafter to form the interior protective facing for the camper body.

As more specifically shown in FIG. 4, in forming the top section 12a of exterior shell 12, a pre-cast reusable female mold 23, formed in the desired configuration, is employed. A similar procedure is also followed in preparing the front and back sections 12b and 12c, respectively. A suitable releasing agent, such as a fluorocarbon dispersion, is preferably utilized as a preparatory coating within the interior of each mold so that a shell section, when completely formed, can be quickly and easily removed from the mold for fast production recycling. Alternatively, a light application of paste wax can be applied to the inner surface of the mold as the preparatory coating to facilitate the quick removal of the molded part.

A preferred manner of formation of the impact-resistant exterior shell components 12a–12c is from a fiberglass-reinforced polymeric material utilizing a polymer spray gun 25, such as for example that manufactured by Glas-Craft of California, of Sun Valley, California, under the trademark SIDEWINDER POLY GUN, which can be used in conjunction with a fiberglass cutter attachment to which is fed a continuous fiberglass strand, made up of a multitude of fine threads, to spray a fiberglass-reinforced resin or similar tooling resin layer by simultaneously spraying cut fiberglass particles and catalyzed resin into the previously prepared self-contained mold 23. A layer of pigmented polyester plastic material, such as that sold by the Refcoa Company of Seattle, Washington, under the trademark REFCOA POLYESTER GELCOAT, for providing a protective outer coating for the camper exterior is first applied to the inner surface of mold 23 followed by a layer (about 1/16 to ¼ inch in thickness) of the fiberglass-reinforced resin. The preferred resin is a low viscosity thixotropic promoter-containing polyester resin such as that sold by Cargill Chemical Products Division under the product designation Polyester PE-530; the formation reaction being catalyzed by an MEK-peroxide solution, such as that sold by the Lucidol Division of Wallace and Tiernan, Inc. under the trademark LUPERSOL 224. After an adequate cure time has elapsed, shell section 12a is removed from the mold, and attached to shell sections 12b and 12c to produce exterior shell 12.

After fixtures 18 are temporarily laid in against framework 14, as will be subsequently described, and the exterior shell 12 placed in position, a foamable, insulating polymer is sprayed from the inside around the fixtures and against the composite shell-framework structure using a polymer spray gun 26, such as the urethane spray gun manufactured by Gusmer Coating, Inc. of Old Bridge, N.J., to form the insulating core layer 16. Insulating layer 16 is preferably formed of a low-density (from about 0.5 to 10 pounds per cubic foot and preferably about 1.5 to 5 pounds per cubic foot) polyurethane material. As an exemplary embodiment, a two component polyurethane foam system having a first stream comprising a blend of a polyol, or other similar active hydrogen-containing compound, such as carboxylic acids, polyesters, polyether and the like, combined with a blowing agent, a surfactant and a catalyst, is reacted at the nozzle of the spray gun 26 with an isocyanate stream to produce the spray formulation employed. By varying the ratios of polyol to isocyanate and the stream components, the properties of the insulating layer can be varied. Optimum conditions for spray application, such as temperature, pressure and air supply volume, are also varied depending on the polyol and isocyanate used. For example, the inner core layer 16, having a density of about two pounds per cubic foot, is formed by spraying a polyurethane material having a first stream comprising a blend of a polyol based on a chlorine-containing dicarboxylic acid, a blowing agent, a surfactant and a catalyst (the entire blend being sold by the Durez Division of Hooker Chemical Company under the trademark HETROFOAM 26024) and a second isocyanate stream of polyphenylisocyanate. The relative ratios by volume of the respective streams is about 1:1. The major advantage of using this polyol blend is that the polyurethane produced is fire-retardant, imparting an added degree of safety to the resultant camper structure.

A fixture 18, such as the open back cabinet shown in FIG. 3, is then temporarily positioned within the confines of the vertical framework member 14 formed of L-shaped angle metal construction. Fastening means 17, such as screws, rivets and the like, passed thru openings 19 in the angle members forming framework 14 and the walls of the cabinet provide temporary support of the fixture until the core layer 16 is sprayed in and cured. The core layer of foam is then sprayed from within the confines of the mold around the fixture until it covers and completely fills the interior of the composite shell-framework to form a layer about 0.75 to 1.5 inches in thickness. The cured foam layer extends inward from exterior shell 12 completely overlaying the framework, fastening means, and about a one inch portion of the fixture walls, respectively, adhering to and locking them together within the interior of the mold to form an integrated camper body with self-contained fixtures. If the above-mentioned polyurethane composition is used as the insulating core layer 16, it is sufficiently cured after spraying so that the final protective coating layer 15 can be immediately applied to the inside of the camper body structure.

In forming the thin inner facing layer 15, most sprayable polymeric laminates capable of forming a protective inner shell for the camper body may be employed, although a high-density, poyurethane having a density greater than 10 pounds per cubic foot and preferably greater than 15 pounds per cubic foot is preferred. For example, by employing a first feed stream, such as the chlorine-containing dicarboxylic acid blend sold by Hooker Chemical Company under the trademark HETROFOAM 368, and a second isocyanate stream of polyphenylisocyanate as before, a layer 15 of high-density, fire-retardant polyurethane, from about 1/16 to ¼ inches in thickness, can be imparted on the inner facing of the camper shell employing the same equipment used to apply the initial core layer 16. The fabrication of the unitary camper body is then completed, except that a layer of the previously described pigmented polyester plastic material (REFCOA POLYESTER GELCOAT) can again be used, if desired, to provide a protective coating for the inner camper surface. The camper body then needs only a brief curing time before the addition of doors and windows, decorative trim and the like to ready the article for the commerical marketplace.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for making a unitary camper body which comprises the steps of:
   a. forming an impact-resistant exterior shell;
   b. mounting said exterior shell on a preformed skeletal reinforcing framework thereby forming a self-contained female mold;
   c. spraying a first layer of polymeric foam into said mold and over substantially the entire inner surface thereof, said foam layer curing in situ and adhering to and locking itself together with said shell and framework, respectively; and
   d. thereafter, before said first layer has fully cured, spraying a second layer of polymeric foam over substantially the entire exposed interior surface of said first layer, thereby providing a protective interior facing for said camper body.

2. The method of claim 1 further characterized in that said first layer is formed of a low-density foamable polyurethane material and said second layer is formed of a high-density foamable polyurethane material.

3. The method of claim 1 wherein fixtures are laid in with temporary fasteners against the inner sides of said skeletal framework prior to said first spraying step, and thereafter said first foam layer is sprayed around said fixtures and against said shell and framework, respectively, so that said first layer upon curing adhers to and acts as the principal means for permanently securing said fixtures in place within said camper body structure.

4. The method of claim 1 wherein said first layer, upon curing, is the principal bonding means for permanently securing together said exterior shell and said supporting skeletal framework, respectively, to form an integrated camper body.

5. The mehod of claim 2 further characterized in that said first layer, upon curing, has a density of from about 0.5 to 10 pounds per cubic foot, and said second layer, upon curing, has a density greater than about 10 pounds per cubic foot and a thickness of from about 1/16 to ¼ of an inch.

6. The method of claim 2 wherein said first layer has a density of from about 1.5 to 5.0 pounds per cubic foot and said second layer has a density greater than 15 pounds per cubic foot.

7. The method of claim 1 wherein said exterior shell is formed from fiberglass-reinforced polymeric resin material.

* * * * *